Jan. 3, 1939. E. ZACHARIÄ 2,142,741
MEASURING DEVICE
Filed April 20, 1937
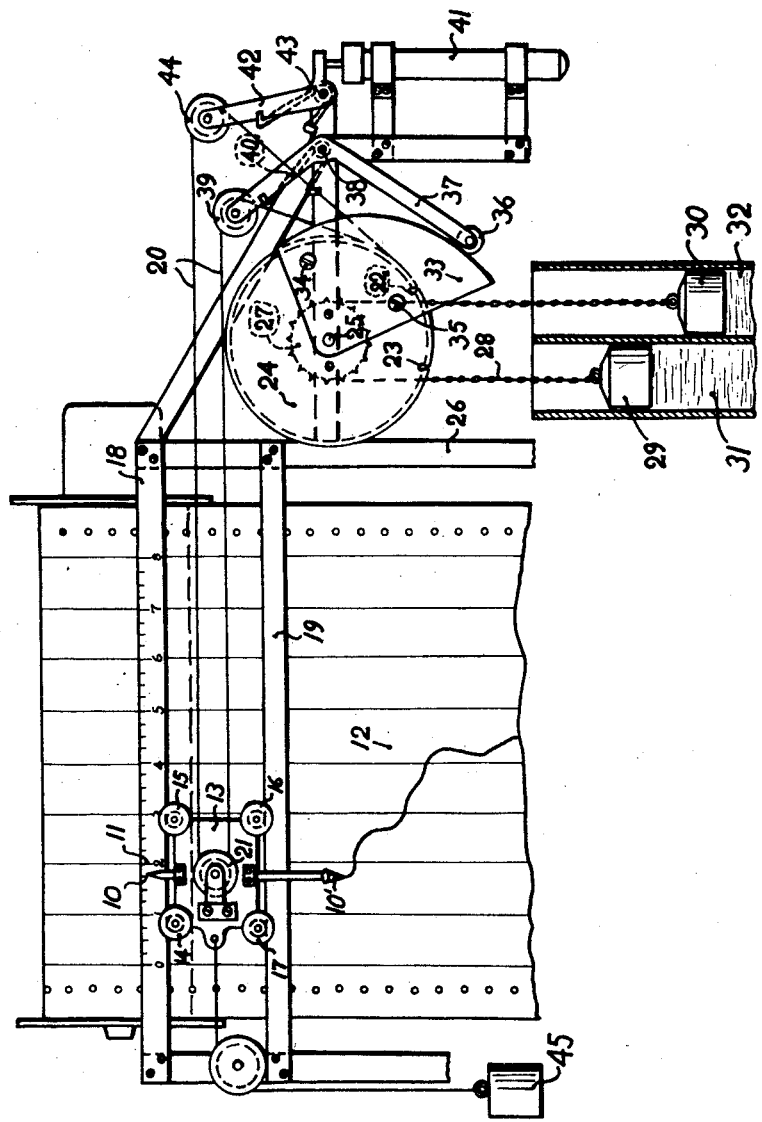
Inventor:
Eich Zachariä

Patented Jan. 3, 1939

2,142,741

UNITED STATES PATENT OFFICE 2,142,741

MEASURING DEVICE

Erich Zachariä, Berlin-Zehlendorf, Germany, assignor to Askania-Werke A. G., a corporation of Germany Application April 20, 1937, Serial No. 138,041
In Germany March 27, 1936

6 Claims. (Cl. 73—151)

This invention relates to measuring apparatus.

It is an object of this invention to provide an exhibiting apparatus in which a predetermined non-linear relation between the movement of the exhibiting member and the movement of an operating member is maintained.

This problem arises, for instance, when it is desired to register or indicate on a linearly graduated scale a value which is itself a non-linear function of a variable.

The problem further arises when it is desired to correct a measurement by one or several factors, for example measurement of the quantity of a gas flowing through a conduit in response to the temperature changes.

The invention aims at providing a simple and reliable apparatus for the purposes outlined hereinbefore.

Further aims, objects, and advantages will appear from a consideration of the description and the accompanying drawing showing an embodiment of this invention. It is to be understood, however, that the description is not to be taken in a limiting sense the scope of this invention being pointed out in the appended claims.

Throughout the specification and claims the term "exhibiting apparatus" is used in a broad sense to comprise indicating as well as recording apparatus.

Referring to the drawing:

The figure shows in elevation and partly in section a combined indicating and recording apparatus embodying the present invention.

An exhibiting member shown in the form of a pointer 10 and a pen 10', the former traveling over a scale 11 and the latter over a strip of recording paper 12 is carried by a carriage 13. The carriage 13 is provided with rollers 14, 15, 16 and 17 running in tracks or bars 18 and 19, thereby guiding the recording member, or members, for straight line movement. A wire, cord or other flexible member 20, for convenience briefly termed "cord" in this specification, is connected to the carriage for moving the same along its track. For this purpose the cord is guided around a roller 21 rotatable on the carriage and secured with its ends in notches 22 and 23 in the rim of a drum or wheel 24 rotatable about a fixed axis 25 in the framework 26 of the apparatus. For operating the drum there is shown a sprocket wheel 27 secured thereto and a chain 28 provided with floats 29 and 30 at its ends. The apparatus of the illustrated example will thus serve to indicate and register the difference of the liquid levels in tubes 31 and 32. Upon a rise of the liquid level in one tube and a corresponding drop in the other the floats will turn the drum 24 by a definite amount and the drum will wind or unwind the cord 20 thereby imparting a primary movement to the carriage.

There is further shown a cam 33 secured to the drum 24 by means of screws 34 and 35 and turning with it. A roller 36 rests against the edge of the cam thereby imparting an angular movement to a lever 37 pivoted at 38 and bearing at its other end a guide roller 39 engaging the cord 20. A spring 40 of the safety-pin type tends to maintain the roller 36 in contact with the cam.

Upon a turning movement of the drum the carriage will not only be moved by the amount by which cord is wound or unwound, but also by a secondary amount, due to the displacement of the axis of the guide roller 39 relatively to the axis of the drum. A clockwise deflection of the lever therefore tends to move the carriage further to the right, and vice versa. The secondary motion superimposed on the cord by the lever 37 is thus a function of the primary movement of the drum.

Further superimposed movements may be imparted to the carriage independently of the primary movement.

In the illustrated example there is shown a thermostat 41 controlling a lever 42 pivoted at 43 and having a further guide roller 44 for engaging the cord. Upon a rise in temperature and a corresponding counterclockwise deflection of the lever 42 the carriage 13 will move farther to the left under the influence of a counterweight 45 to correct the indicated and recorded value.

Obviously the present invention is not restricted to the particular embodiment herein shown and described. Moreover, it is not indispensable that all the features of this invention be used conjointly, since they may be employed advantageously in various combinations and subcombinations.

What is claimed is:

1. Exhibiting device comprising, in combination, an exhibiting member; guiding means for guiding said member for straight line movement; a cord connected to said member; actuating means connected to said cord for imparting a primary movement to the cord; and means movable independently of said member and directly engaging said cord to deflect it between said member and actuating means for superimposing a secondary movement on said cord for additionally moving said member.

2. Exhibiting device comprising, in combination, an exhibiting member; guiding means for guiding said member for straight line movement; a cord connected to said member; means for winding and unwinding said cord for imparting a primary movement to said member; and means movable independently of said member and directly engaging said cord to deflect it between said member and actuating means for superimposing a secondary movement on said cord for additionally moving said member.

3. Exhibiting device comprising, in combination, an exhibiting member; a carriage supporting said member; a track for guiding said carriage for straight-line movement; a cord connected to said carriage; a drum for winding and unwinding said cord thereby imparting a primary movement to said carriage; actuating means connected to turn said drum in response to a measurement; a movable guide roller engaging said cord between said drum and carriage; and means for displacing the axis of said guide roller relatively to the axis of the drum for superimposing a secondary movement on said cord and additionally moving said member.

4. Exhibiting device comprising, in combination, an exhibiting member; a carriage supporting said member; a track for guiding said carriage for straight-line movement; a cord connected to said carriage; a drum for winding and unwinding said cord thereby imparting a primary movement to said carriage; actuating means connected to turn said drum in response to a measurement; a movable guide roller engaging said cord between said drum and carriage; a movable support for said roller; a cam connected to turn with said drum and arranged to displace said support thereby superimposing on said cord a secondary movement which is a function of said measurement.

5. Exhibiting device comprising, in combination, an exhibiting member; a carriage supporting said member; a track for guiding said carriage for straight-line movement; a cord connected to said carriage; a drum for winding and unwinding said cord thereby imparting a primary movement to said carriage; actuating means connected to turn said drum in response to a measurement; a movable guide roller engaging said cord between said drum and carriage; and means for displacing in response to the turning movement of said drum the axis of said guide roller relatively to the axis of the drum for superimposing a secondary movement on said cord and additionally moving said member.

6. Exhibiting device comprising, in combination, an exhibiting member; a carriage supporting said member; a track for guiding said carriage for straight-line movement; a cord connected to said carriage; a drum for winding and unwinding said cord thereby imparting a primary movement to said carriage; actuating means connected to turn said drum in response to a measurement; a movable guide roller engaging said cord between said drum and carriage; and means for displacing independently of the turning movement of said drum the axis of said guide roller relatively to the axis of the drum for superimposing a secondary movement on said cord and additionally moving said member.

ERICH ZACHARIÄ.